March 3, 1931. W. J. PHILPOTT ET AL 1,794,981
SHOCK ABSORBER
Filed Jan. 25, 1928
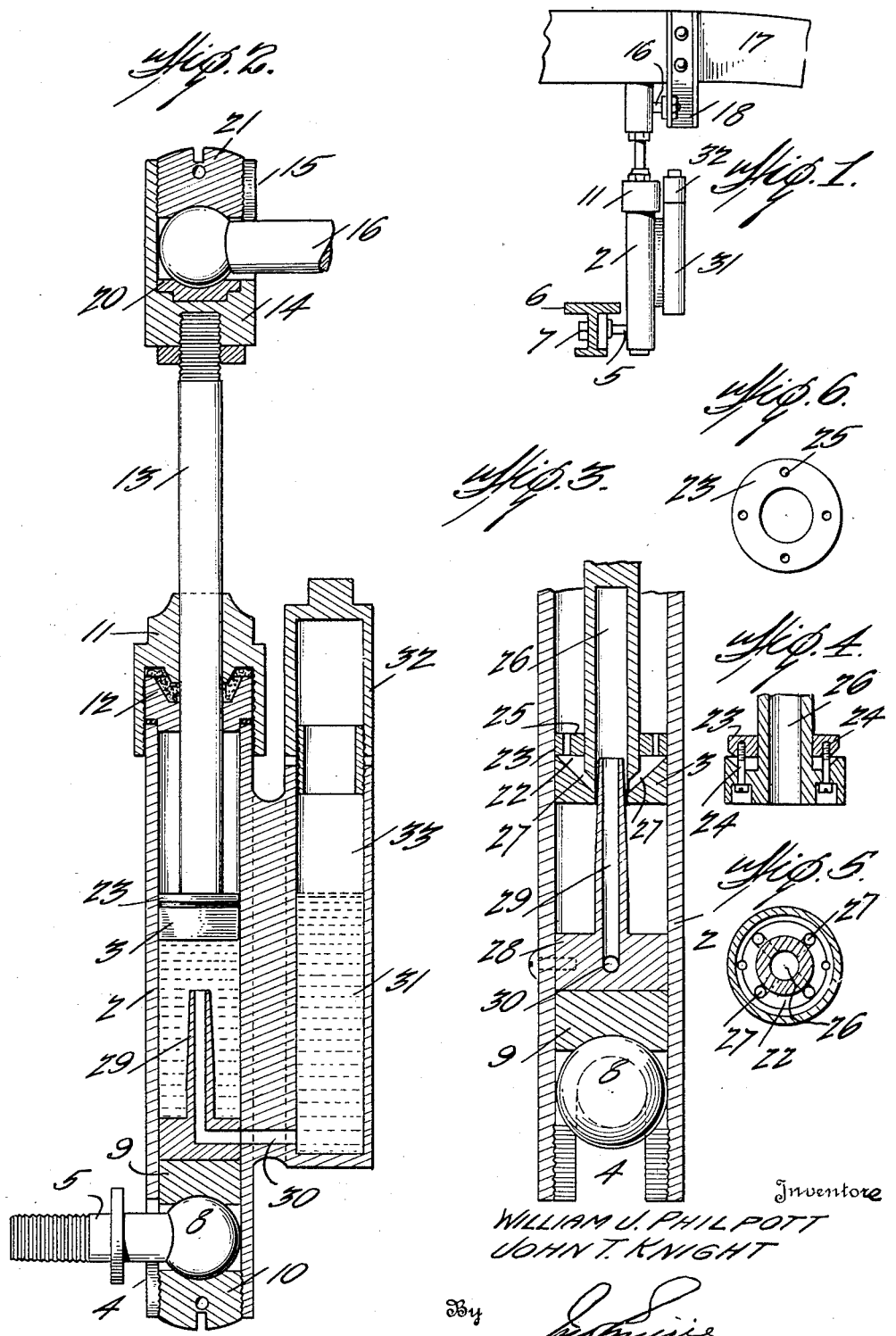
Inventors
WILLIAM J. PHILPOTT
JOHN T. KNIGHT
By
Attorney Patented Mar. 3, 1931

1,794,981

UNITED STATES PATENT OFFICE

WILLIAM JOHN PHILPOTT, OF ST. KILDA, AND JOHN TENNENT KNIGHT, OF CLUNES, VICTORIA, AUSTRALIA

SHOCK ABSORBER

Application filed January 25, 1928, Serial No. 249,450, and in Australia December 7, 1927.

This invention relates to an improved shock-absorber adapted for use on motor vehicles between the chassis and the axle to absorb road shocks during travelling and to prevent violent or excessive rebound of the suspension springs.

The improved shock-absorber is so constructed that it has a cushioning action during the tensioning of the suspension springs, and a uniform retarded action during the rebound of the springs. The device embodies an oil or liquid filled cylinder, a plunger slidable within said cylinder and valvular control means on said plunger, whereby on the downstroke of the plunger the liquid is permitted to freely pass from the lower end of the cylinder to the upper end thereof, but during the upstroke of the plunger is constrained to flow through small passages to retard the movement of the plunger and prevent violent rebound of the springs.

Means are provided for retarding the movement of the plunger at the termination of its downward stroke to ensure a cushioning effect, and means are employed to compensate for the displacement caused by the movement of the piston rod into and out of the cylinder.

Reference is made to the accompanying drawings wherein:—

Figure 1 is a view showing the improved shock-absorber fitted to the front axle of a motor vehicle.

Figure 2 is a sectional view of the improved shock-absorber device.

Figure 3 is an enlarged sectional view of the lower end of the cylinder and of the valve of the device.

Figure 4 is a sectional detail view illustrating the plunger and valve of the device.

Figure 5 is a plan view of the plunger with the valve removed.

Figure 6 is a plan view of the valve.

The improved shock-absorber comprises a cylinder 2 which is filled with oil, glycerine or other suitable liquid and is fitted with a sliding plunger 3. The lower end of the cylinder is slotted at 4 to receive an arm 5, which is connected to the vehicle axle 6 by suitable fastening means such as lock-nuts 7. The inner end of the arm 5 is constructed having a ball 8 which is swivelly accommodated within the lower end of the cylinder and is retained therein by a seating block 9 and screw plug 10.

The upper end of the cylinder is fitted with a cover plate 11 having a gland or packing member 12 through which the plunger rod 13 is slidably passed. The plunger 3 may be formed integrally with the lower end of the plunger rod. The upper end of the plunger rod is fitted with a tubular fitting 14 slotted at 15 to receive an arm 16 which is connected to the chassis member 17 of the vehicle by a channel-iron bracket 18. The arm 16 is constructed having a ball 19 which is swivelly accommodated in the fitting 14 and is retained against displacement by a seating member 20 and a screw plug 21.

Formed on the upper surface of the sliding plunger 3 is an annular valve seating 22 accommodating a flat valve 23, which is slidably mounted on the lower end of the plunger rod 13. Said valve is movably connected to the plunger by screws 24 or the like functioning as guides, and it is formed with a plurality of small bleed holes 25 through which the oil or liquid in the cylinder is caused to flow when said valve is closed upon its seating.

The lower end 26 of the plunger rod is of hollow or tubular construction and is constructed with a plurality of diagonal ports 27 formed in its wall to communicate with the valve seat 22 in the plunger, see Figure 3. Fitted into the lower end of the cylinder is a plug or bottom piece 28 provided with an upstanding axial rod 29 of tapered construction adapted to project into the lower tubular end 26 of the plunger rod and thereby regulate the flow of oil therethrough. Said axial rod is of tubular construction and is connected at its lower end by a horizontal passage 30 to an oil storage and displacement chamber 31 arranged adjacent to the cylinder. This oil storage chamber is fitted at its upper end with a hollow cover 32 which forms an air chamber 33 to compensate for the displacement caused by the movement of the plunger rod into and out of the cylinder.

When shocks are imparted to the wheels of a vehicle equipped with the shock-absorber, the suspension springs are tensioned in the usual manner and the plunger 3 of the shock-absorber is caused to move downwardly towards the bottom of the cylinder. This action exerts pressure on the liquid beneath the plunger causing it to flow through the diagonal ports 27 and open the valve 23 to pass into the upper portion of the cylinder. As the passage of the liquid around the valve can take place comparatively rapidly owing to the relatively large size of the ports 27, the movement of the plunger 3 is not excessively retarded. Consequently, the road shock is freely taken by the vehicle suspension springs. Towards the termination of the downward stroke of the plunger 3 the tubular end 26 of the plunger rod is gradually closed by the upstanding tapered rod 29, see Figure 3, and the flow of liquid is thus restricted. This action, by reason of the retardation of further downward movement of the plunger, sets up a cushioning action, such as will prevent jars at the termination of the plunger downstroke and any excessive tensioning of the vehicle suspension springs. Any displacement which may result from the movement of the piston rod 13 into the cylinder caused portion of the liquid in the cylinder to flow through the passage 30 into the chamber 31 wherein it is accommodated by the compression of the quantity of air contained in the air space 33.

This construction prevents liquid being forced through the gland 12 at the upper end of the cylinder or the parts of the shock-absorber damaged by excessive pressure of the liquid.

During the rebound of the suspension springs, the plunger 3 moves upwardly within the cylinder, but during this movement the valve 23 is held tightly upon its seating 22 by the created suctional force. The liquid above the plunger is thus constrained to flow through the small bleed holes 25 only, and as this passage of the liquid is relatively slow by reason of the smallness of the bleed holes, the plunger is effectively retarded during the whole of its upward stroke, thus preventing violent and excessive rebound of the springs and obviating jars and shocks originating from that cause.

The swivel coupling 8 between the lower end of the cylinder and the vehicle axle 6 enables the shock-absorber to freely adjust itself during one-wheel and similar shocks, while the ball connection 19 at the upper end of the plunger rod enables the shock-absorber to have limited freedom of movement relative to the chassis 17.

What we do claim is:—

1. A shock absorber comprising a liquid containing cylinder, a hollow piston sliding in said cylinder, a closed air chamber partially filled with liquid, and a connection including a tube in the bottom of the cylinder connecting said cylinder and chamber allowing the liquid to pass from one to the other, said tube engaging in the hollow piston to regulate the flow of liquid when a shock occurs.

2. A shock absorber comprising a liquid containing cylinder, a hollow piston sliding in said cylinder, a hollow valve in said piston providing a restricted passage for the liquid, a closed air chamber partially filled with the liquid, and a connection including a tube in the bottom of the cylinder connecting said cylinder and chamber allowing the liquid to pass from one to the other, said tube engaging in the hollow piston and valve to regulate the flow of liquid when a shock occurs.

3. A shock absorber comprising a liquid containing cylinder, a piston sliding in said cylinder, the lower end of said piston being substantially tubular, a valve carried by the piston restricting the passage of the liquid around the piston, an upstanding tapered tube at the bottom of the cylinder adapted to fit into the lower end of the piston, a closed air chamber partially filled with liquid, the said chamber being connected with the upstanding tube to allow the passage of the liquid from the cylinder to the chamber.

4. An improved shock absorber for attachment across the suspension springs of motor vehicles comprising a cylinder filled with liquid, a plunger slidable in said cylinder, a plunger rod with a tubular lower end, diagonal passages formed in the plunger and communicating with said tubular end, a valve slidable on the plunger rod to control the diagonal passages, small bleed holes in said valve, and a tapered member on the lower end of the cylinder to extend in the tubular end of the plunger rod and retard the flow of liquid through the diagonal passages when the plunger approaches the termination of its downward stroke wherein the tapered member on the lower end of the cylinder is tubular and is connected to an air chamber provided to compensate for displacement caused by the movement of the plunger rod into the cylinder.

In testimony whereof we affix our signatures.

WILLIAM JOHN PHILPOTT.
JOHN TENNENT KNIGHT.